US011801838B2

(12) United States Patent
Yu

(10) Patent No.: US 11,801,838 B2
(45) Date of Patent: Oct. 31, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventor: Kaijiang Yu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 327 days.

(21) Appl. No.: 17/210,543

(22) Filed: Mar. 24, 2021

(65) Prior Publication Data

US 2021/0300375 A1 Sep. 30, 2021

(30) Foreign Application Priority Data

Mar. 31, 2020 (JP) .................................. 2020-063496

(51) Int. Cl.
*B60W 30/18* (2012.01)
*B60W 30/14* (2006.01)
(Continued)

(52) U.S. Cl.
CPC .... *B60W 30/18163* (2013.01); *B60W 30/143* (2013.01); *B60W 30/16* (2013.01);
(Continued)

(58) Field of Classification Search
CPC ......... B60W 30/18163; B60W 30/143; B60W 30/16; B60W 40/04; B60W 2554/4041;
(Continued)

(56) References Cited

U.S. PATENT DOCUMENTS 10,131,306 B2 * 11/2018 Takae ...................... B60R 21/00
10,259,459 B2 * 4/2019 Takae ...................... G08G 1/167
(Continued)

FOREIGN PATENT DOCUMENTS

CN   111994089 A   * 11/2020
JP   11-345396      12/1999
(Continued)

OTHER PUBLICATIONS

C. Burger, T. Schneider and M. Lauer, "Interaction aware cooperative trajectory planning for lane change maneuvers in dense traffic," 2020 IEEE 23rd International Conference on Intelligent Transportation Systems (ITSC), Rhodes, Greece, 2020, pp. 1-8, doi: 10.1109/ITSC45102.2020.9294638. (Year: 2020).*
(Continued)

*Primary Examiner* — Angelina Shudy
(74) *Attorney, Agent, or Firm* — AMIN, TUROCY & WATSON, LLP

(57) ABSTRACT

A vehicle control device performs first control for causing a vehicle to perform lane change to a fourth lane adjacent to a third lane by causing the vehicle to pass through an area between a first other vehicle and a second other vehicle in a traveling direction and an area between a third other vehicle and a fourth other vehicle in the traveling direction, when it is determined that a relationship between the first other vehicle and the vehicle satisfies a first condition, a relationship between the second other vehicle and the vehicle satisfies a second condition stricter than the first condition, a relationship between the third other vehicle and the vehicle satisfies a third condition stricter than the first condition, and a relationship between the fourth other vehicle and the vehicle satisfies a fourth condition stricter than the second condition and the third condition.

9 Claims, 8 Drawing Sheets

(51) Int. Cl.
*B60W 30/16* (2020.01)
*B60W 40/04* (2006.01)

(52) U.S. Cl.
CPC ..... *B60W 40/04* (2013.01); *B60W 2554/4041* (2020.02); *B60W 2554/4042* (2020.02); *B60W 2554/4049* (2020.02); *B60W 2554/806* (2020.02)

(58) Field of Classification Search
CPC . B60W 2554/4042; B60W 2554/4049; B60W 2554/806; B60W 2554/801; B60W 2554/802; B60W 10/04; B60W 10/18; B60W 10/20; B60W 30/09; B60W 30/18154; B60W 2556/50; B60W 50/14; B60W 2420/42; B60W 2420/52; B60W 60/00276; B60W 30/0956; G08G 1/166
See application file for complete search history.

(56) References Cited

U.S. PATENT DOCUMENTS

| | | | | |
|---|---|---|---|---|
| 10,351,137 | B2* | 7/2019 | Shin | B60W 30/18163 |
| 10,632,997 | B2* | 4/2020 | Inou | G08G 1/167 |
| 11,180,139 | B2* | 11/2021 | Katayama | B60W 30/12 |
| 11,267,473 | B2* | 3/2022 | Takahashi | B60W 40/04 |
| 11,390,284 | B2* | 7/2022 | Yu | B60W 30/095 |
| 11,541,891 | B2* | 1/2023 | Aoki | B60W 30/16 |
| 11,541,892 | B2* | 1/2023 | Hiramatsu | G08G 1/167 |
| 11,565,700 | B2* | 1/2023 | Oguro | B60W 30/18163 |
| 2004/0107030 | A1* | 6/2004 | Nishira | B60W 50/08 348/148 |
| 2014/0107867 | A1* | 4/2014 | Yamashiro | B60W 40/06 701/2 |
| 2016/0272199 | A1* | 9/2016 | Kawahara | G08G 1/04 |
| 2016/0297447 | A1* | 10/2016 | Suzuki | B60W 30/16 |
| 2016/0347327 | A1* | 12/2016 | Kondo | B60W 50/0098 |
| 2017/0120909 | A1* | 5/2017 | Oniwa | G05D 1/0212 |
| 2017/0242435 | A1* | 8/2017 | Nilsson | G05D 1/0214 |
| 2017/0243491 | A1* | 8/2017 | Fujii | G08G 1/167 |
| 2017/0248959 | A1* | 8/2017 | Matsubara | B60W 30/00 |
| 2017/0315551 | A1* | 11/2017 | Mimura | B60W 50/08 |
| 2018/0046196 | A1* | 2/2018 | Hashimoto | B60W 10/20 |
| 2018/0057002 | A1* | 3/2018 | Lee | B60W 60/00276 |
| 2018/0178802 | A1* | 6/2018 | Miyata | B60W 50/14 |
| 2018/0194364 | A1* | 7/2018 | Asakura | G05D 1/0061 |
| 2018/0215389 | A1* | 8/2018 | Takae | B60R 21/00 |
| 2018/0240345 | A1* | 8/2018 | So | G08G 1/166 |
| 2018/0357904 | A1* | 12/2018 | Miyata | B60W 30/18163 |
| 2019/0016339 | A1* | 1/2019 | Ishioka | B60W 40/04 |
| 2019/0047469 | A1* | 2/2019 | Nishiguchi | B62D 15/0255 |
| 2019/0061758 | A1* | 2/2019 | Ide | B60W 10/20 |
| 2019/0084558 | A1* | 3/2019 | Kaminade | B60W 30/18163 |
| 2019/0126927 | A1* | 5/2019 | Uejima | B60K 28/06 |
| 2019/0143972 | A1* | 5/2019 | Ishioka | G08G 1/167 701/70 |
| 2019/0212749 | A1* | 7/2019 | Chen | G06N 20/00 |
| 2019/0382021 | A1* | 12/2019 | Niibo | B60W 10/20 |
| 2020/0079375 | A1* | 3/2020 | Takahashi | B60W 30/09 |
| 2020/0079427 | A1* | 3/2020 | Takahashi | G08G 1/167 |
| 2020/0097008 | A1* | 3/2020 | Sadat | G08G 1/0125 |
| 2020/0342760 | A1* | 10/2020 | Vassilovski | H04W 4/06 |
| 2020/0406892 | A1* | 12/2020 | Yu | G06V 20/588 |
| 2021/0139044 | A1* | 5/2021 | Ishioka | B60R 21/00 |
| 2021/0163011 | A1* | 6/2021 | Maru | G08G 1/167 |
| 2021/0237739 | A1* | 8/2021 | Hayakawa | B60W 30/18163 |
| 2022/0126882 | A1* | 4/2022 | Oh | B60W 40/04 |
| 2022/0163341 | A1* | 5/2022 | Maru | G01C 21/3658 |
| 2022/0315053 | A1* | 10/2022 | Wada | G01S 17/58 |
| 2023/0033172 | A1* | 2/2023 | Kim | B60W 60/0015 |
| 2023/0103248 | A1* | 3/2023 | Abrash | B60W 10/04 701/26 |
| 2023/0174070 | A1* | 6/2023 | Oniwa | B60W 50/10 701/41 |
| 2023/0182733 | A1* | 6/2023 | Iwasaki | B60W 30/16 701/96 |

FOREIGN PATENT DOCUMENTS

| | | | |
|---|---|---|---|
| JP | 2004341941 A | * 12/2004 | |
| JP | 2018-025976 | 2/2018 | |
| JP | 2018-047828 | 3/2018 | |
| WO | WO-2021032306 A1 | * 2/2021 | B60Q 1/34 |

OTHER PUBLICATIONS

CN-111994089-A translation (Year: 2020).*
Japanese Office Action for Japanese Patent Application No. 2020-063496 dated Oct. 26, 2021.

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2020-063496, filed Mar. 31, 2020, the content of which is incorporated herein by reference.

BACKGROUND

Field of the Invention

The invention relates to a vehicle control device, a vehicle control method, and a storage medium.

Description of Related Art

In the related art, a system that performs a lane change in consideration of a position and a speed of a nearby vehicle has been disclosed (see Japanese Unexamined Patent Application, First Publication No. H11-345396).

However, in such a system, maintaining a pace (speed) which is desired by a vehicle or an occupant of the vehicle during traveling of the vehicle has not been sufficiently considered.

SUMMARY

The invention was made in consideration of the aforementioned circumstances and an objective thereof is to provide a vehicle control device, a vehicle control method, and a storage medium that can maintain a pace (speed) which is desired by a vehicle or an occupant of the vehicle during traveling of the vehicle.

A vehicle control device, a vehicle control method, and a storage medium according to the invention employ the following configurations.

(1) According to an aspect of the invention, a vehicle control device is provided, including: a storage device configured to store a program; and a hardware processor, wherein the hardware processors performs, by executing a program stored in the storage device: recognizing surrounding conditions of a vehicle including at least a position and a speed of another vehicle which is traveling near the vehicle and travels in the same direction as the vehicle; and causing the vehicle to travel based on the recognized surrounding conditions, wherein the other vehicle includes: a first other vehicle that is traveling in front of the vehicle in a traveling direction in a second lane adjacent to a first lane in which the vehicle is traveling and that is closest to the vehicle; a second other vehicle that is traveling behind the vehicle in the traveling direction in the second lane and that is closest to the vehicle; a third other vehicle that is traveling in front of the vehicle in the traveling direction in a third lane which is adjacent to the second lane and farther from the first lane than the second lane and that is closest to the vehicle; and a fourth other vehicle that is traveling behind the vehicle in the traveling direction in the third lane and that is closest to the vehicle, wherein the hardware processor is configured to acquire information of the other vehicles, and wherein the hardware processor is configured to perform, when it is determined that a relationship between the first other vehicle and the vehicle satisfies a first condition, a relationship between the second other vehicle and the vehicle satisfies a second condition stricter than the first condition, a relationship between the third other vehicle and the vehicle satisfies a third condition stricter than the first condition, and a relationship between the fourth other vehicle and the vehicle satisfies a fourth condition stricter than the second condition and the third condition, first control for causing the vehicle to perform a lane change to a fourth lane adjacent to the third lane by causing the vehicle to pass through an area between the first other vehicle and the second other vehicle in the traveling direction and an area between the third other vehicle and the fourth other vehicle in the traveling direction.

(2) In the vehicle control device according to the aspect (1), the first condition is a condition in which a time period when it is assumed that the first other vehicle is traveling at a specific position at which the vehicle is traveling in the traveling direction is greater than a first threshold value, the time period is obtained by subtracting a time period until the first other vehicle reaches a reference position from a current location from a time period until the first other vehicle reaches the reference position, the second condition is a condition in which a time period until the second other vehicle reaches the specific position from a current location is greater than a second threshold value, the third condition is a condition in which a time period when it is assumed that the third other vehicle is traveling at the specific position is greater than a third threshold value, the time period is obtained by subtracting a time period until the third other vehicle reaches the reference position from a current location from a time period until the third other vehicle reaches the reference position, and the fourth condition is a condition in which a time period until the fourth other vehicle reaches the specific position from a current location is greater than a fourth threshold value.

(3) In the vehicle control device according to the aspect (2), the second threshold value is greater than the first threshold value, the fourth threshold value is greater than the third threshold value, the third threshold value is greater than the first threshold value, and the fourth threshold value is greater than the second threshold value.

(4) In the vehicle control device according to the aspect (2) or (3), the reference position is a start position at which the second lane is separated from the first lane in which the vehicle is traveling, and the hardware processor causes the vehicle to move to the fourth lane before the vehicle reaches the reference position.

(5) In the vehicle control device according to any one of the aspects (1) to (4), the first control is control for causing the vehicle to move to the fourth lane without staying in the second lane and the third lane for a predetermined time or more.

(6) In the vehicle control device according to any one of the aspects (1) to (5), the hardware processor is configured to perform second control which is different from the first control when one of the first condition, the second condition, the third condition, and the fourth condition is not satisfied, and the second control is control for causing the vehicle to stay in the second lane or the third lane for a predetermined time or more.

(7) In the vehicle control device according to any one of the aspects (1) to (6), the first other vehicle, the second other vehicle, the third other vehicle, and the fourth other vehicle are vehicles within a predetermined distance from the vehicle in the traveling direction.

(8) In the vehicle control device according to any one of the aspects (1) to (7), the hardware processor is configured to perform the first control when another vehicle is not traveling within a predetermined distance from the vehicle in the traveling direction on the fourth lane.

(9) According to another aspect of the invention, a vehicle control method which is performed by a computer is provided, the vehicle control method including: a process of recognizing surrounding conditions of a vehicle including at least a position and a speed of another vehicle which is traveling near the vehicle and travels in the same direction as the vehicle; and a process of causing the vehicle to travel based on the recognized surrounding conditions, wherein the other vehicle includes: a first other vehicle that is traveling in front of the vehicle in a traveling direction in a second lane adjacent to a first lane in which the vehicle is traveling and that is closest to the vehicle; a second other vehicle that is traveling behind the vehicle in the traveling direction on the second lane and that is closest to the vehicle; a third other vehicle that is traveling in front of the vehicle in the traveling direction in a third lane which is adjacent to the second lane and farther from the first lane than the second lane and that is closest to the vehicle; and a fourth other vehicle that is traveling behind the vehicle in the traveling direction in the third lane and that is closest to the vehicle, wherein the vehicle control method further includes: acquiring information of the other vehicles; and performing first control for causing the vehicle to perform a lane change to a fourth lane adjacent to the third lane by causing the vehicle to pass through an area between the first other vehicle and the second other vehicle in the traveling direction and an area between the third other vehicle and the fourth other vehicle in the traveling direction, when it is determined that a relationship between the first other vehicle and the vehicle satisfies a first condition, a relationship between the second other vehicle and the vehicle satisfies a second condition stricter than the first condition, a relationship between the third other vehicle and the vehicle satisfies a third condition stricter than the first condition, and a relationship between the fourth other vehicle and the vehicle satisfies a fourth condition stricter than the second condition and the third condition.

(10) According to another aspect of the invention, a non-transitory computer readable storage medium is provided that stores a program causing a computer to perform: a process of recognizing surrounding conditions of a vehicle including at least a position and a speed of another vehicle which is traveling near the vehicle and travels in the same direction as the vehicle; and a process of causing the vehicle to travel based on the recognized surrounding conditions, wherein the other vehicle includes: a first other vehicle that is traveling in front of the vehicle in a traveling direction in a second lane adjacent to a first lane in which the vehicle is traveling and that is closest to the vehicle; a second other vehicle that is traveling behind the vehicle in the traveling direction in the second lane and that is closest to the vehicle; a third other vehicle that is traveling in front of the vehicle in the traveling direction in a third lane which is adjacent to the second lane and farther from the first lane than the second lane and that is closest to the vehicle; and a fourth other vehicle that is traveling behind the vehicle in the traveling direction in the third lane and that is closest to the vehicle, wherein the program causes the computer to further perform: acquiring information of the other vehicles; and performing first control for causing the vehicle to perform a lane change to a fourth lane adjacent to the third lane by causing the vehicle to pass through an area between the first other vehicle and the second other vehicle in the traveling direction and an area between the third other vehicle and the fourth other vehicle in the traveling direction, when it is determined that a relationship between the first other vehicle and the vehicle satisfies a first condition, a relationship between the second other vehicle and the vehicle satisfies a second condition stricter than the first condition, a relationship between the third other vehicle and the vehicle satisfies a third condition stricter than the first condition, and a relationship between the fourth other vehicle and the vehicle satisfies a fourth condition stricter than the second condition and the third condition.

According to the aspects (1) to (10), by causing the hardware processor or the computer to cause the vehicle to perform a lane change to the fourth lane when the relationships between the other vehicles and the vehicle satisfy the conditions, it is possible to maintain a pace (speed) which is desired by the vehicle or an occupant of the vehicle. The vehicle can travel without causing an occupant of the vehicle to feel uncomfortable during traveling of the vehicle.

According to the aspect (2) or (3), the hardware processor can flexibly cope with a change in behavior of a vehicle traveling on the third lane.

DETAILED DESCRIPTION OF THE INVENTION

Hereinafter, a vehicle control device, a vehicle control method, and a storage medium according to an embodiment of the invention will be described with reference to the accompanying drawings.

Overall Configuration

Figure 1:
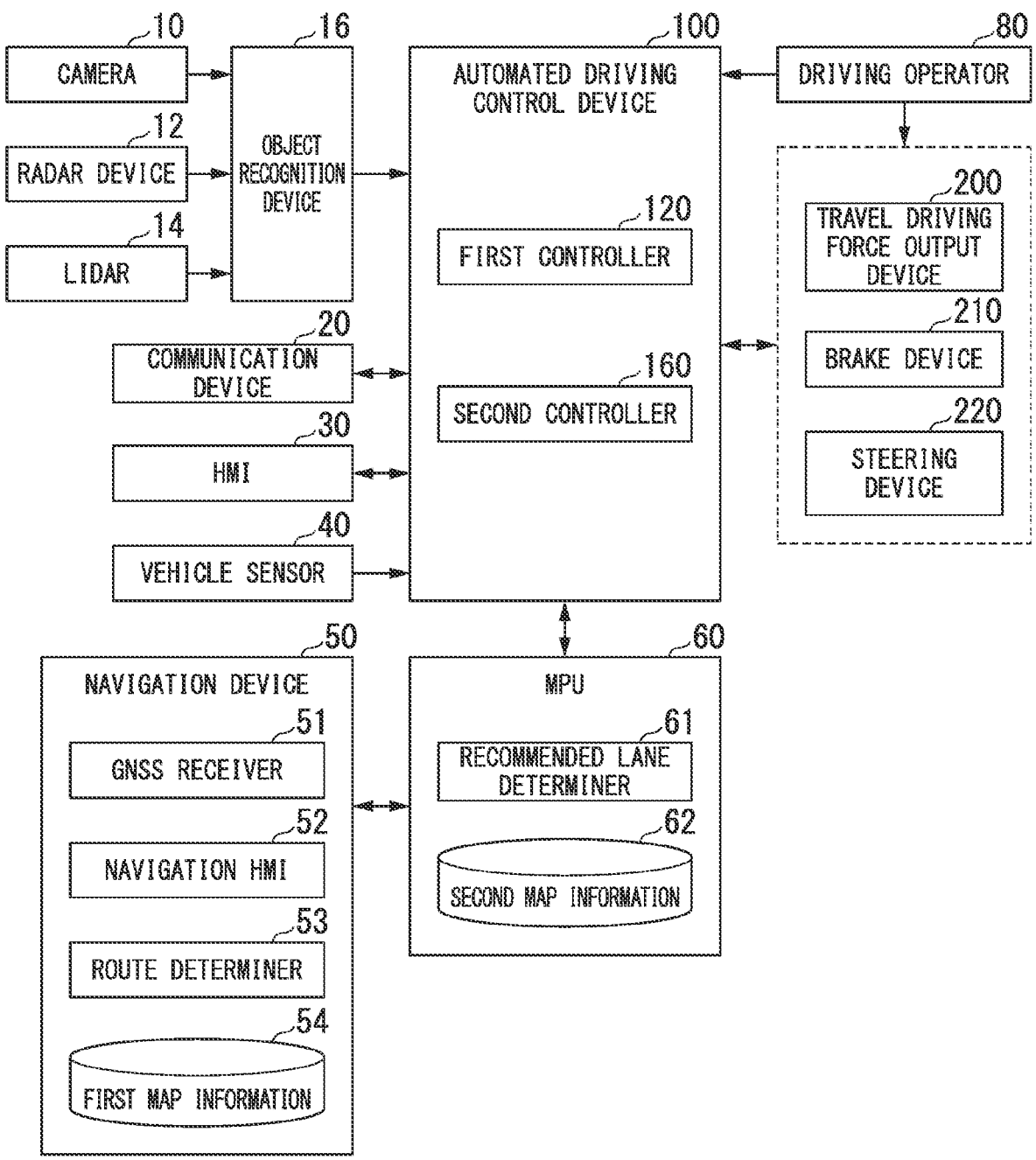
FIG. 1 is a diagram showing a configuration of a vehicle system employing a vehicle control device according to an embodiment.

FIG. 1 is a diagram showing a configuration of a vehicle system 1 employing a vehicle control device according to an embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to the internal combustion engine or electric power which is discharged from a secondary battery or a fuel cell.

The vehicle system 1 includes, for example, a camera 10, a radar device 12, a Light Detection and Ranging (LIDAR) 14, an object recognition device 16, a communication device 20, a human-machine interface (HMI) 30, a vehicle sensor 40, a navigation device 50, a map-positioning unit (MPU) 60, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration shown in FIG. 1 is only an example and a part of the configuration may be omitted or another configuration may be added thereto.

The camera 10 is, for example, a digital camera using a solid-state imaging device such as a charge-coupled device (CCD) or a complementary metal-oxide-semiconductor (CMOS). The camera 10 is attached to an arbitrary position on a vehicle (hereinafter, referred to as a vehicle M) in which the vehicle system 1 is mounted. When the front view of the vehicle is imaged, the camera 10 is attached to an upper part of a front windshield, a rear surface of a rearview mirror, or the like. The camera 10 images surroundings of the vehicle M, for example, periodically and repeatedly. The camera 10 may be a stereoscopic camera.

The radar device 12 radiates radio waves such as millimeter waves to the surroundings of the vehicle M, detects radio waves (reflected waves) reflected by an object, and detects at least a position (a distance and a direction) of the object. The radar device 12 is attached to an arbitrary position on the vehicle M. The radar device 12 may detect a position and a speed of an object using a frequency-modulated continuous wave (FM-CW) method.

The LIDAR 14 applies light (or electromagnetic waves of wavelengths close to light) to the surroundings of the vehicle M and measures scattered light. The LIDAR 14 detects a distance to an object on the basis of a time from emission of light to reception of light. The light which is applied is, for example, a pulse-like laser beam. The LIDAR 14 is attached to an arbitrary position on the vehicle M.

The object recognition device 16 performs a sensor fusion process on results of detection from some or all of the camera 10, the radar device 12, and the LIDAR 14 and recognizes a position, a type, a speed, and the like of an object. The object recognition device 16 outputs the result of recognition to the automated driving control device 100. The object recognition device 16 may output the results of detection from the camera 10, the radar device 12, and the LIDAR 14 to the automated driving control device 100 without any change. The object recognition device 16 may be omitted from the vehicle system 1.

The communication device 20 communicates with, for example, other vehicles near the vehicle M using a cellular network, a Wi-Fi network, Bluetooth (registered trademark), or dedicated short-range communication (DSRC) or communicates with various types of server devices via a radio base station.

The HMI 30 presents various types of information to an occupant of the vehicle M and receives an input operation from the occupant. The HMI 30 includes various types of display devices, speakers, buzzers, a touch panel, switches, and keys.

The vehicle sensor 40 includes a vehicle speed sensor that detects a speed of the vehicle M, an acceleration sensor that detects acceleration, a yaw rate sensor that detects an angular velocity around the vertical axis, and a direction sensor that detects a direction of the vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies the position of the vehicle M on the basis of signals received from GNSS satellites. The position of the vehicle M may be identified or corrected by an inertial navigation system (INS) using the output of the vehicle sensor 40. The navigation HMI 52 includes a display device, a speaker, a touch panel, and keys. The whole or a part of the navigation HMI 52 may be shared by the HMI 30. For example, the route determiner 53 determines a route (hereinafter referred to as a route on a map) from the position of the vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include curvatures of roads or point of interest (POI) information. The route on a map is output to the MPU 60. The navigation device 50 may perform guidance for a route using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determiner 61 and stores second map information 62 in a storage device such as an HDD or a flash memory. The recommended lane determiner 61 divides a route on a map supplied from the navigation device 50 into a plurality of blocks (for example, every 100 [m] in a vehicle travel direction) and determines a recommended lane for each block with reference to the second map information 62. The recommended lane determiner 61 determines in which lane from the leftmost the vehicle is to travel. When there is a branching point in the route on a map, the recommended lane determiner 61 determines a recommended lane such that the vehicle M can travel on a rational route for traveling to a branching destination.

The second map information 62 is map information with higher precision than that of the first map information 54. The second map information 62 includes, for example, information on the centers of lanes or information on boundaries of lanes. The second map information 62 may include road information, traffic regulation information, address information (addresses and postal codes), facility information, and phone number information. The second map information 62 may be updated from time to time by causing the communication device 20 to communicate with another device.

The driving operator 80 includes, for example, an accelerator pedal, a brake pedal, a shift lever, a steering wheel, a deformed steering wheel, a joystick, and other operators. A sensor that detects an amount of operation or performing of an operation is attached to the driving operator 80, and results of detection thereof are output to the automated driving control device 100 and some or all of the travel driving force output device 200, the brake device 210, and the steering device 220.

The automated driving control device 100 includes, for example, a first controller 120 and a second controller 160. The first controller 120 and the second controller 160 are realized, for example, by causing a hardware processor such as a central processing unit (CPU) to execute a program (software). Some or all of such elements may be realized by hardware (which includes circuitry) such as a large-scale integration (LSI), an application-specific integrated circuit (ASIC), or a field-programmable gate array (FPGA), or a graphics-processing unit (GPU) or may be realized by cooperation of software and hardware. The program may be stored in a storage device (a storage device including a non-transitory storage medium) such as an HDD or a flash memory of the automated driving control device 100 in advance, or may be stored in a removable storage medium such as a DVD or a CD-ROM and be installed in the HDD or the flash memory of the automated driving control device 100 by attaching the removable storage medium (a non-transitory storage medium) to a drive device. The automated driving control device 100 is an example of a "vehicle control device."

Figure 2:
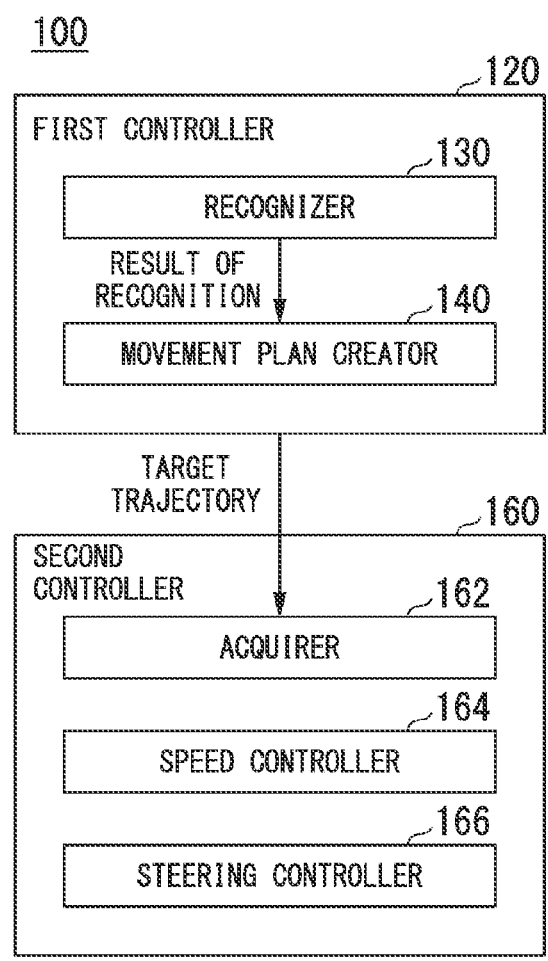
FIG. 2 is a diagram showing functional configurations of a first controller and a second controller.

FIG. 2 is a diagram showing functional configurations of the first controller 120 and the second controller 160. The first controller 120 includes, for example, a recognizer 130 and a movement plan creator 140. The first controller 120 is realized, for example, by performing a function based on artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched), scoring both recognitions, and comprehensively evaluating both recognitions. Accordingly, reliability of automated driving is secured.

The recognizer 130 recognizes a state such as a position, a speed, or acceleration of an object near the vehicle M on the basis of information input from the camera 10, the radar device 12, and the LIDAR 14 via the object recognition device 16. For example, a position of an object is recognized as a position in an absolute coordinate system with an origin set to a representative point of the vehicle M (such as the center of gravity or the center of a drive shaft) and is used for control. A position of an object may be expressed as a representative point such as the center of gravity or a corner of the object or may be expressed as a drawn area. A "state" of an object may include an acceleration or a jerk of the object or a "moving state" (for example, whether a lane change is being performed or whether a lane change is going to be performed) thereof.

The recognizer 130 recognizes, for example, a lane in which the vehicle M is traveling (a travel lane). For example, the recognizer 130 recognizes the travel lane by comparing a pattern of lane markings near the vehicle M which are recognized from an image captured by the camera 10 with a pattern of lane markings (for example, arrangements of a solid line and a dotted line) which are acquired from the second map information 62. The recognizer 130 may recognize the travel lane by recognizing travel road boundaries (road boundaries) including lane markings, edges of roadsides, curbstones, medians, and guard rails, not limited to the lane markings. In this recognition, the position of the vehicle M acquired from the navigation device 50 and the result of processing from the INS may be considered. The recognizer 130 recognizes a stop line, an obstacle, a red signal, a toll gate, or other road events.

The recognizer 130 recognizes a position or a direction of the vehicle M relative to a travel lane at the time of recognition of the travel lane. The recognizer 130 may recognize, for example, a distance of a reference point of the vehicle M from a lane center and an angle of the travel direction of the vehicle M with respect to a line formed by connecting the lane centers as the position and the direction of the vehicle M relative to the travel lane. Instead, the recognizer 130 may recognize a position of the reference point of the vehicle M relative to one side line of the travel lane (a lane marking or a road boundary) or the like as the position of the vehicle M relative to the travel lane.

The movement plan creator 140 creates a target trajectory in which the vehicle M will travel autonomously (without requiring a driver's operation) in the future such that the vehicle M can travel in a recommended lane determined by the recommended lane determiner 61 in principle and cope with surrounding conditions of the vehicle M. A target trajectory includes, for example, a speed element. For example, a target trajectory is expressed by sequentially arranging points (trajectory points) at which the vehicle M is to arrive. Trajectory points are points at which the vehicle M is to arrive at intervals of a predetermined traveling distance (for example, about several [m]) along a road, and a target speed and a target acceleration at intervals of a predetermined sampling time (for example, about below the decimal point [sec]) are created as a part of a target trajectory in addition. Trajectory points may be positions at which the vehicle M is to arrive at intervals of a predetermined sampling time. In this case, information of the target speed or target acceleration is expressed by intervals between the trajectory points.

The movement plan creator 140 may set events of automated driving in creating a target trajectory. The events of automated driving include a constant-speed travel event, a low-speed following travel event, a lane change event, a branching event, a merging event, and a take-over event. The movement plan creator 140 creates a target trajectory based on events which are started.

The second controller 160 controls the travel driving force output device 200, the brake device 210, and the steering device 220 such that the vehicle M travels along a target trajectory created by the movement plan creator 140 as scheduled.

The second controller 160 includes, for example, an acquirer 162, a speed controller 164, and a steering controller 166. The acquirer 162 acquires information of a target trajectory (trajectory points) created by the movement plan creator 140 and stores the acquired information in a memory (not shown). The speed controller 164 controls the travel driving force output device 200 or the brake device 210 on the basis of a speed element accessory to the target trajectories stored in the memory. The steering controller 166 controls the steering device 220 on the basis of curved states of the target trajectories stored in the memory. The processes of the speed controller 164 and the steering controller 166 are realized, for example, in combination of feed-forward control and feedback control. For example, the steering controller 166 performs control in combination of feed-forward control based on a curvature of a road in front of the vehicle M and feedback control based on a distance from the target trajectory.

The travel driving force output device 200 outputs a travel driving force (a torque) for allowing the vehicle to travel to the driving wheels. The travel driving force output device 200 includes, for example, a combination of an internal combustion engine, an electric motor, and a transmission and an electronic controller (ECU) that controls them. The ECU controls the aforementioned constituents on the basis of information input from the second controller 160 or information input form the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of the information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the driving operator 80 to change the direction of the turning wheels.

Processes for Lane Change

Figure 3:
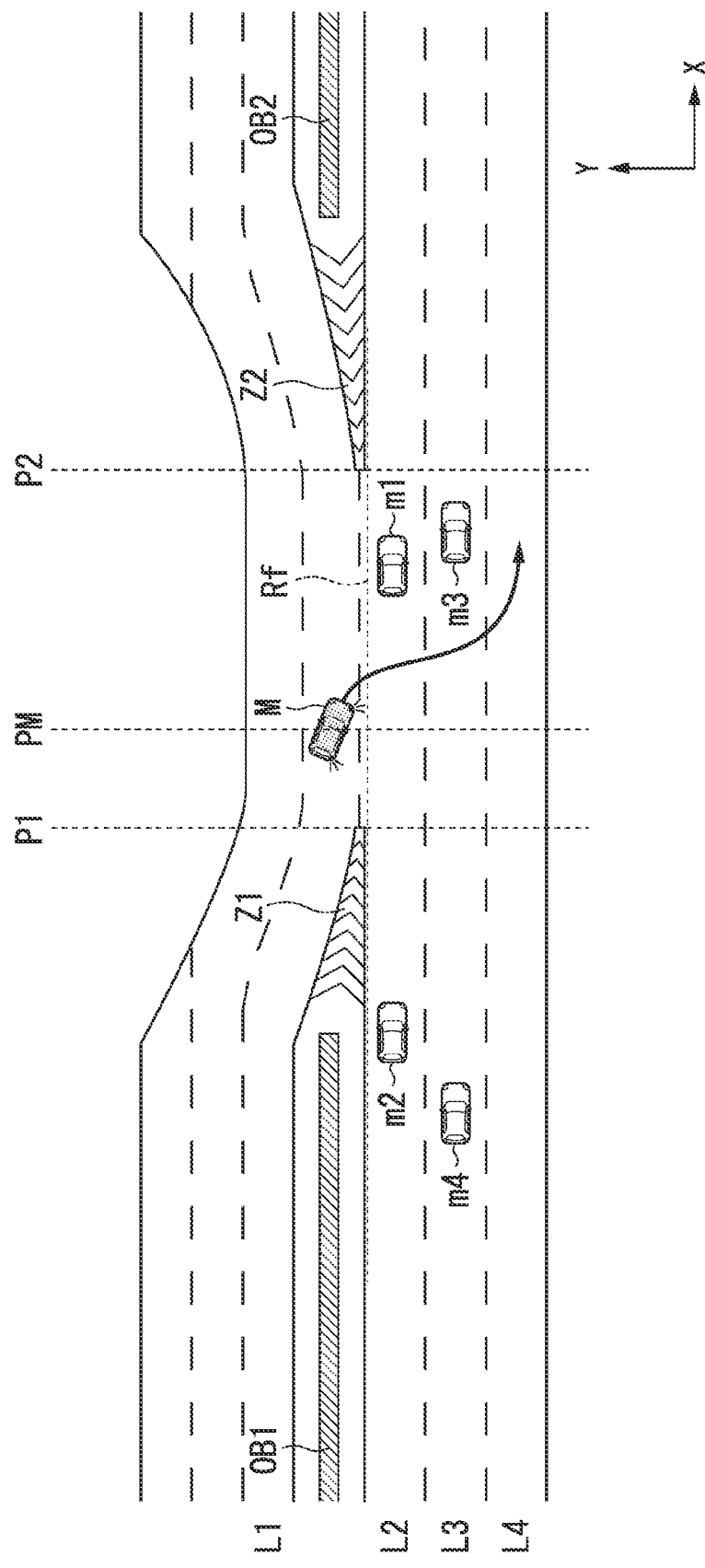
FIG. 3 is a diagram showing a process of performing a lane change of a vehicle.

FIG. 3 is a diagram showing a process of causing the vehicle M to perform a lane change. In the following description, the travel direction of the vehicle (an extending direction of a road) may be defined as an X direction and a width direction of the vehicle (a width direction of a road) may be defined as a Y direction.

A road shown in FIG. 3 includes, a first lane L1, a second lane L2, a third lane L3, and a fourth lane L4. The first lane L1 is a lane joining the second lane. The first lane L1 branches from the second lane L2 at a predetermined distance after joining the second lane L2. The vehicle M traveling in the first lane L1 can enter the second lane L2 in a joinable section. The joinable section is a section between a position P1 and a position P2.

In the −X direction from the position P1, a zebra zone (a channelizing strip) Z1 and a marking object OB1 are provided between the first lane L1 and the second lane L2. The marking object OB1 is provided in the −X direction from the zebra zone Z1. The position P1 is an end in the +X direction from the zebra zone Z1. In the +X direction from the position P2, a zebra zone Z2 and a marking object OB2 are provided between the first lane L1 and the second lane L2. The marking object OB2 is provided in the +X direction from the zebra zone Z2. The position P2 is an end in the −X direction from the zebra zone Z2.

The automated driving control device 100 acquires information of first to fourth other vehicles m1 to m4 from the recognizer 130 when the vehicle reaches a specific position PM (for example, a specific position PM and a reference line Rf) in the first lane L1 in the travel direction, and performs first control for causing the vehicle M to pass through an area between the first other vehicle m1 and the second other vehicle em2 in the travel direction and an area between the third other vehicle m3 and the fourth other vehicle m4 in the travel direction and causing the vehicle M to perform a lane change to a fourth lane L4 adjacent to the third lane 3 when it is determined that a relationship between the first other vehicle m1 and the vehicle M satisfies a first condition, a relationship between the second other vehicle m2 and the vehicle M satisfies a second condition which is stricter than the first condition, a relationship between the third other vehicle m3 and the vehicle M satisfies a third condition which is stricter than the first condition, and a relationship between the fourth other vehicle m4 and the vehicle M satisfies a fourth condition which is stricter than the second condition and the third condition.

For example, when there is no other vehicle within a predetermined distance from the vehicle M in the travel direction in the fourth lane L4, the automated driving control device 100 performs the first control. Satisfaction of the first to fourth conditions means that displacement times which will be described later are greater than threshold values. Details of the first to fourth conditions, the displacement times, and the threshold values will be described later.

For example, the first other vehicle m1 and the second other vehicle m2 are traveling in the second lane L2, and the third other vehicle m3 and the fourth other vehicle m4 are traveling in the third lane L3. The first to fourth other vehicles m1 to m4 are traveling at a speed higher than that of the vehicle M. For example, the vehicle M is traveling at about 60 km/h, and the first to fourth other vehicles m1 to m4 are traveling at about 100 km/h.

The specific position PM has only to be located between the position P1 and the position P2 and is preferably a position immediately after the vehicle M has passed through the position P1 as shown in FIG. 3. The reference line Rf is a line which is virtually set at a boundary between the first lane L1 and the second lane L2 in the joinable section.

The first control is control for causing the vehicle M to move to the fourth lane L4 without staying in the second lane L2 and the third lane L3 for a predetermined time or more. "Without staying" means, for example, that a time in which the center axis direction of the vehicle M and the extending direction of a lane are parallel to each other is less than the predetermined time and the vehicle M travels to obliquely cross the lane at the speed of the vehicle M.

The automated driving control device 100 performs second control which is different from the first control when one or more conditions of the first to fourth conditions are not satisfied. The second control is control for causing the vehicle M to stay in the second lane L2 or the third lane L3 for a predetermined time or more. "Staying" means, for example, that the time in which the center axis direction of the vehicle M and the extending direction of a lane are parallel (substantially parallel) to each other is equal to or greater than the predetermined time.

Displacement Time

Figure 4:
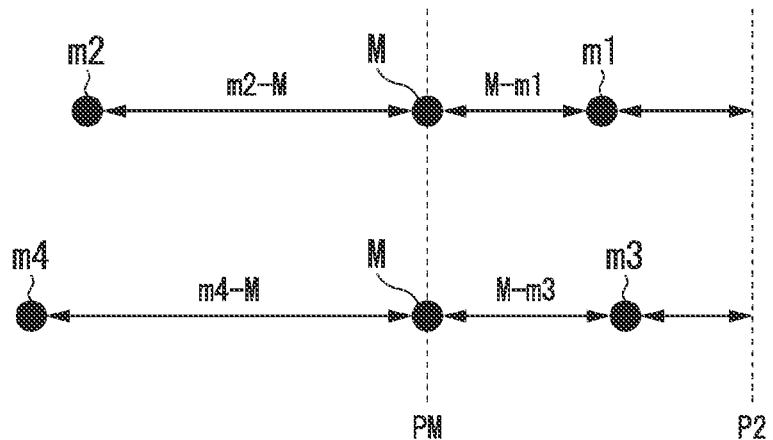
FIG. 4 is a diagram showing a displacement time.

FIG. 4 is a diagram showing a displacement time. The automated driving control device 100 calculates displacement times of the first to fourth other vehicles m1 to m4. A displacement time is, for example, a time obtained by dividing a distance of a predetermined section by a speed of a target vehicle.

(1) Displacement Time M-m1 of First Other Vehicle m1

The displacement time M-m1 is a time obtained by subtracting a time in which the first other vehicle m1 reaches the position P2 from the current location from a time in which the first other vehicle m1 reaches the position P2 when it is assumed that the first other vehicle m1 is located at the specific position PM at which the vehicle M is located in the travel direction.

(2) Displacement Time m2-M of Second Other Vehicle m2

The displacement time m2-M is a time in which the second other vehicle m2 reaches the specific position PM from the current location.

(3) Displacement Time M-m3 of Third Other Vehicle m3

The displacement time M-m3 is a time obtained by subtracting a time in which the third other vehicle m3 reaches the position P2 from the current location from a time in which the third other vehicle m3 reaches the position P2 when it is assumed that the third other vehicle m3 is located at the specific position PM.

(4) Displacement Time m4-M of Fourth Other Vehicle m4

The displacement time m4-M based on the displacement of the fourth other vehicle m4 is a time in which the fourth other vehicle m4 reaches the specific position PM from the current location.

Threshold Value

Figure 5:
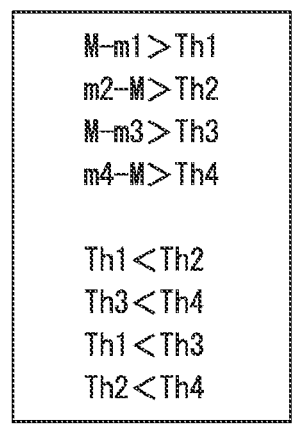
FIG. 5 is a diagram showing a threshold value which is set for the displacement time.

FIG. 5 is a diagram showing threshold values which are set for the displacement times. A threshold value is set for each of the displacement time M-m1, the displacement time m2-M, the displacement time M-m3, and the displacement time m4-M. A threshold value Th1 is set for the displacement time M-m1, a threshold value Th2 is set for the displacement time m2-M, a threshold value Th3 is set for the displacement time M-m3, and a threshold value Th4 is set for the displacement time m4-M.

When the displacement time M-m1 is greater than the threshold value Th1, the displacement time m2-M is greater than the threshold value Th2, the displacement time M-m3 is greater than the threshold value Th3, and the displacement time m4-M is greater than the threshold value Th4, the first control is performed. In other words, when the first to fourth conditions are satisfied, the first control is performed. When one displacement time of the first displacement time M-m1, the displacement time m2-M, the displacement time M-m3, and the displacement time m4-M is not greater than the threshold value set for the corresponding displacement time, the second control is performed.

The relationship between the threshold values is as follows. The threshold value Th2 is greater than the threshold value Th1. The threshold value Th4 is greater than the threshold value Th3. The threshold value Th3 is greater than the threshold value Th1. The threshold value Th4 is greater than the threshold value Th2. The threshold value Th2 and the threshold value Th3 may be equal to or different from each other.

Figure 6:
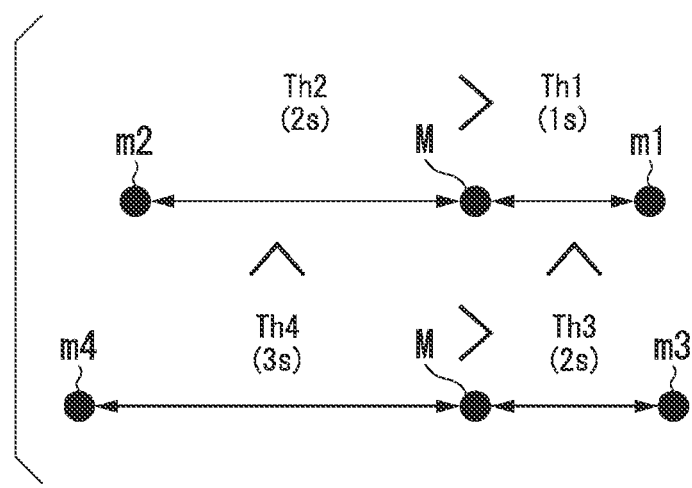
FIG. 6 is a diagram showing a relationship between threshold values.

FIG. 6 is a diagram showing the relationship between the threshold values. As described above, the threshold values (the threshold value Th2 and the threshold value Th4) for the displacement times (the displacement time m2-M and the displacement time m4-M) of vehicles traveling in the back are set to be greater than the threshold values (the threshold value Th1 and the threshold value Th3) for the displacement times (the displacement time M-m1 and the displacement time M-m3) of vehicles traveling in front in the same lanes. Accordingly, the vehicle M can maintain a state in which it is separated a predetermined distance from another vehicle traveling at a speed higher than that of the vehicle M. Even when the speed of the following vehicle changes, the vehicle M can satisfactorily maintain the distance from the following vehicle.

As described above, the threshold values (the threshold value Th2 and the threshold value Th4) for the displacement times (the displacement time M-m3 and the displacement time m4-M) of the vehicles traveling in the third lane L3 are set to be greater than the threshold values (the threshold value Th1 and the threshold value Th2) for the displacement times (the displacement time M-m1 and the displacement time m2-M) of the vehicles traveling in the second lane L2 (the lane closer to the lane in which the vehicle M is traveling).

Accordingly, the likelihood that the speed of the third other vehicle m3 or the fourth other vehicle m4 will change can be considered, and the vehicle M can move with a margin to the fourth lane L4 even when the speed of the third other vehicle m3 or the fourth other vehicle m4 changes (when the third other vehicle m3 decelerates or the fourth other vehicle m4 accelerates). In the vehicle M, there is a likelihood that behavior of the third other vehicle m3 or the fourth other vehicle m4 located in the far third lane L3 will change in a time until the vehicle M moves to the third lane L3. A margin for the third other vehicle m3 or the fourth other vehicle m4 located in the third lane L3 far from the vehicle M is set to be greater than a margin for the first other vehicle m1 or the second other vehicle m2 located in the second lane L2 closer from the vehicle M. Accordingly, the vehicle M can move to the fourth lane L4 while flexibly coping with change in behavior of the third other vehicle m3 or the fourth other vehicle m4.

An example in which the vehicle enters a lane that is three lanes away (the fourth lane L4) from the lane of the vehicle is described above, but the processes in this embodiment may be performed even when the vehicle enters a lane that is four lanes away from the lane of the vehicle. The lane that is four lanes away is a fifth lane. In this case, conditions for lanes located therebetween (the second to fourth lanes) are added, and the condition for the relationship between another vehicle traveling in front of the vehicle M in the second to fourth lanes and the vehicle is set to be stricter than the first condition and to be stricter as the corresponding lane becomes farther from the first lane. The condition for the relationship between another vehicle traveling behind the vehicle M in the second to fourth lanes and the vehicle M is set to be stricter than the second condition and to be stricter as the corresponding lane becomes farther from the first lane. The same is true when the vehicle M enters a lane that is five or more lanes away.

Trajectory Along which Vehicle Performs Lane Change

Figure 7:
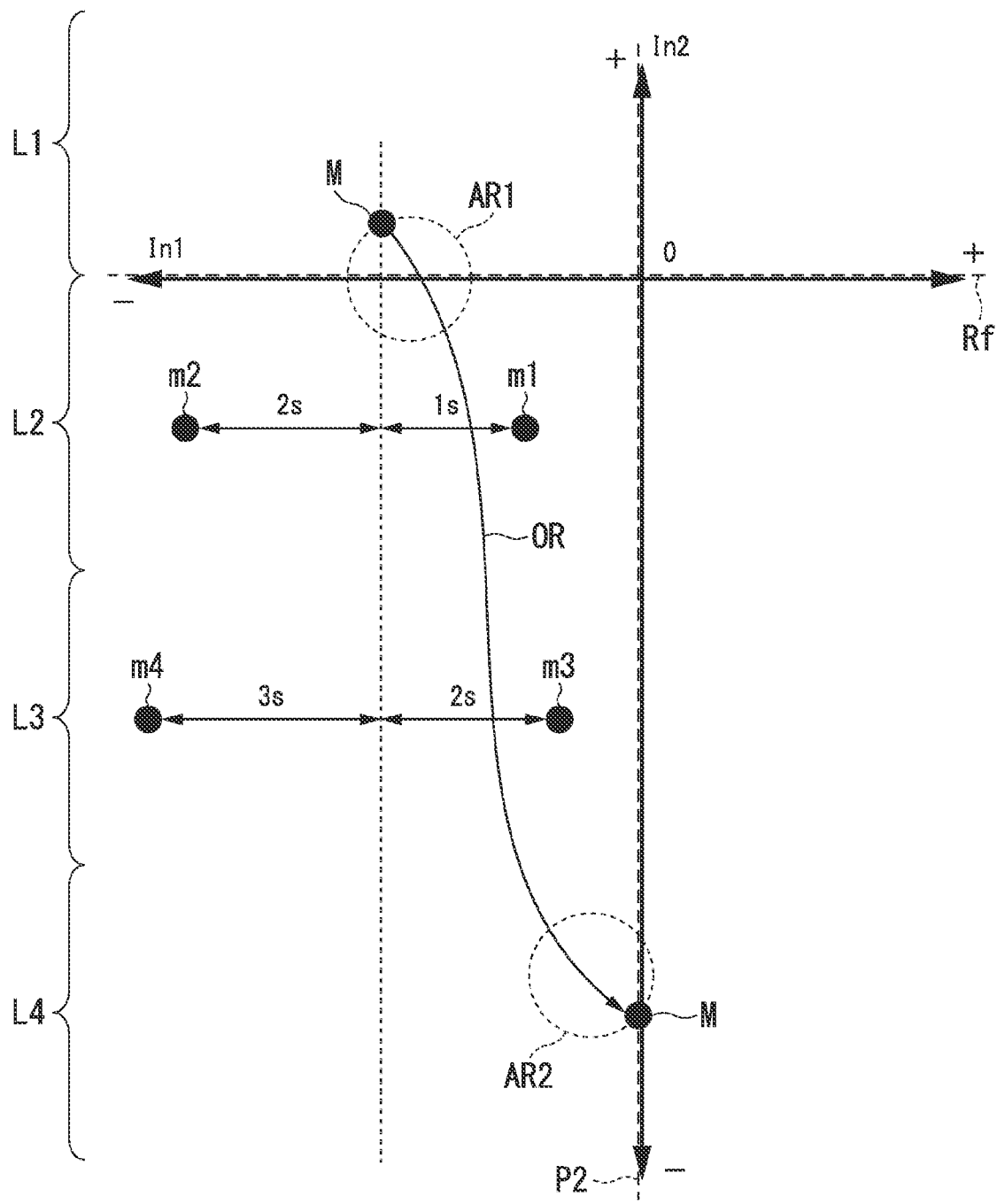
FIG. 7 is a diagram showing an example of a trajectory when a vehicle performs a lane change.

FIG. 7 is a diagram showing an example of a trajectory when the vehicle M performs a lane change. FIG. 7 is a diagram conceptually showing a trajectory along which the vehicle M performs a lane change. The horizontal axis in FIG. 7 represents an index In1 for a position of a vehicle and the vertical axis in FIG. 7 represents an index In2 for a speed of a vehicle. Coordinates at which the index In1 is zero are coordinates corresponding to the position P2, and coordinates at which the index In2 is zero, that is, an axis representing the index In1, correspond to the reference line Rf. The index In1 is a value obtained by dividing a distance from the position P2 to the target vehicle (a distance which is expressed as a minus value) by the speed of the target vehicle. The index In2 is a value obtained by dividing a distance from the reference position of a target vehicle (for example, the center axis or a cross point between a vehicle head and the center axis) to the reference line Rf by a speed in the lateral direction of the target vehicle.

The first to fourth other vehicles m1 to m4 do not actually move in the lateral direction, but the coordinates are plotted on the assumption that the other vehicles move from the reference line Rf to the reference position (for example, the center) of a lane in which each vehicle is traveling at a predetermined speed in the lateral direction for the purpose of convenience. For example, the coordinates are plotted on the assumption that the first to fourth other vehicles m1 to m4 move in the lateral direction, for example, at 1 msec.

The automated driving control device 100 generates a trajectory OR for allowing the vehicle M to pass between the first other vehicle m1 and the second other vehicle m2 and between the third other vehicle m3 and the fourth other vehicle m4 in the graph shown in FIG. 7, and controls the vehicle M on the basis of the generated trajectory. For example, the trajectory OR is a trajectory which is set in advance or a trajectory which is set on the basis of the speed of the vehicle M and the speeds of the other vehicles. The trajectory OR is a trajectory corresponding to the behavior with which an occupant of the vehicle M does not feel uncomfortable when the vehicle M performs the behavior based on the trajectory OR. An end point of the trajectory OR is the position P2. In other words, the vehicle M completes a lane change up to the position P2.

The speed in the lateral direction in an area AR1 immediately after the vehicle M has started movement in the lateral direction in the trajectory OR and the speed in the lateral direction in an area AR2 immediately before the vehicle M has ended movement in the lateral direction in the trajectory OR are lower than the speeds in the lateral direction in other areas (an area of the trajectory OR during the lane change). As shown in FIG. 7, the slope of the trajectory in the area AR1 and the area AR2 is less than the slope in other areas. Accordingly, it is possible to curb sudden behavior of the vehicle M at the start and end time of the lane change and to improve ride quality of an occupant.

First to Fourth Other Vehicles m1 to m4

Figure 8:
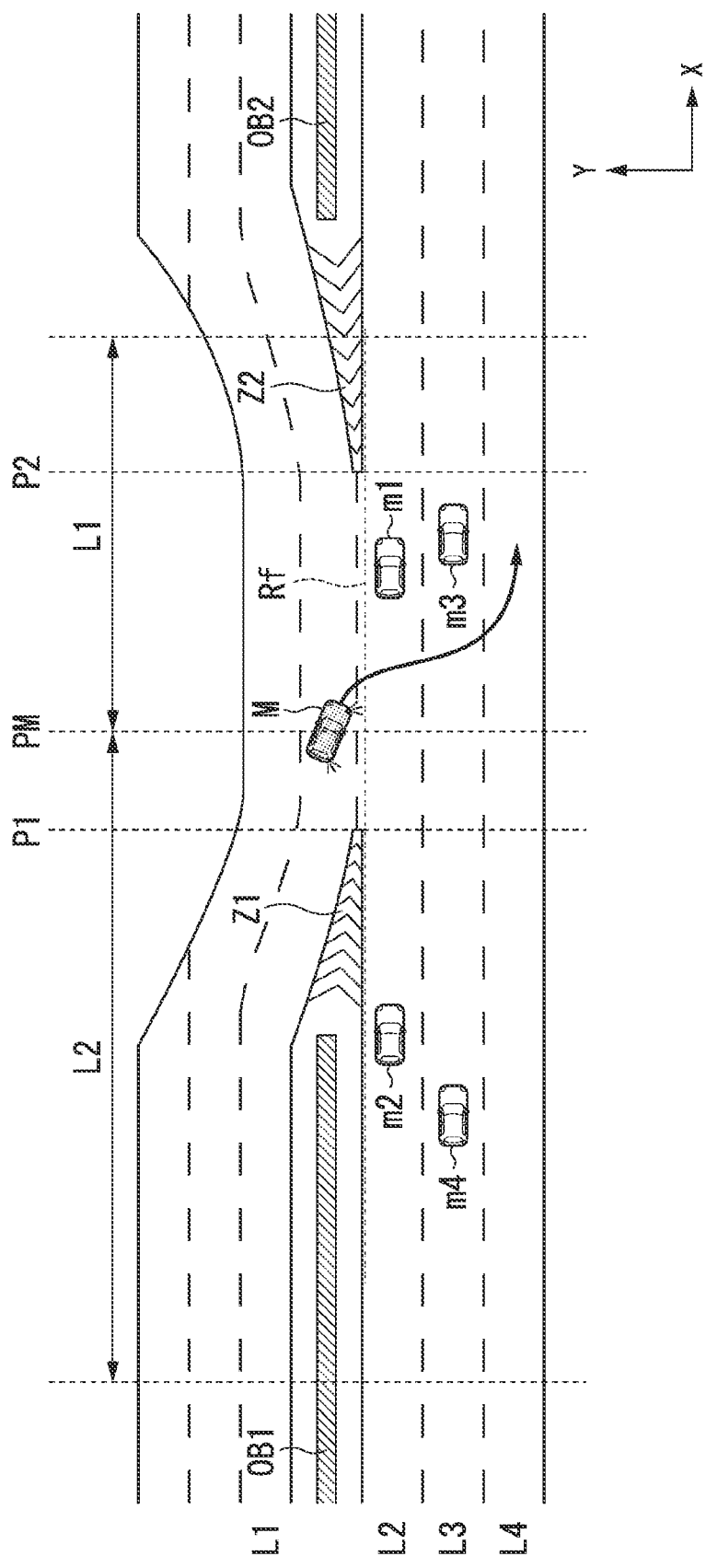
FIG. 8 is a diagram showing examples of first to fourth other vehicles.

In the travel direction, the automated driving control device 100 sets a vehicle which is located in a first distance L1 from the vehicle M in the second lane L2 as the first other vehicle, sets a vehicle which is located in the first distance L1 (or a predetermined distance different from the first distance L1) from the vehicle M in the third lane L3 as the second other vehicle, sets a vehicle which is located in a second distance L2 from the vehicle M in the second lane L2 as the third other vehicle, and sets a vehicle which is located in the second distance L2 (or a predetermine distance from the second distance L2) from the vehicle M in the third lane L3 as the fourth other vehicle. FIG. 8 is a diagram showing an example of the first to fourth other vehicles m1 to m4.

The first distance L1 or the second distance L2 is a distance obtained by multiplying a reference speed derived from speeds of vehicles which traveled in the second lane L2 and the third lane L3 in the past by a predetermined time. The reference speed is a speed corresponding to a relatively high speed, an average speed, or a median value of the vehicles which traveled in the second lane L2 and the third lane L3. For example, the first distance L1 is less than the second distance L2.

Flowchart

Figure 9:
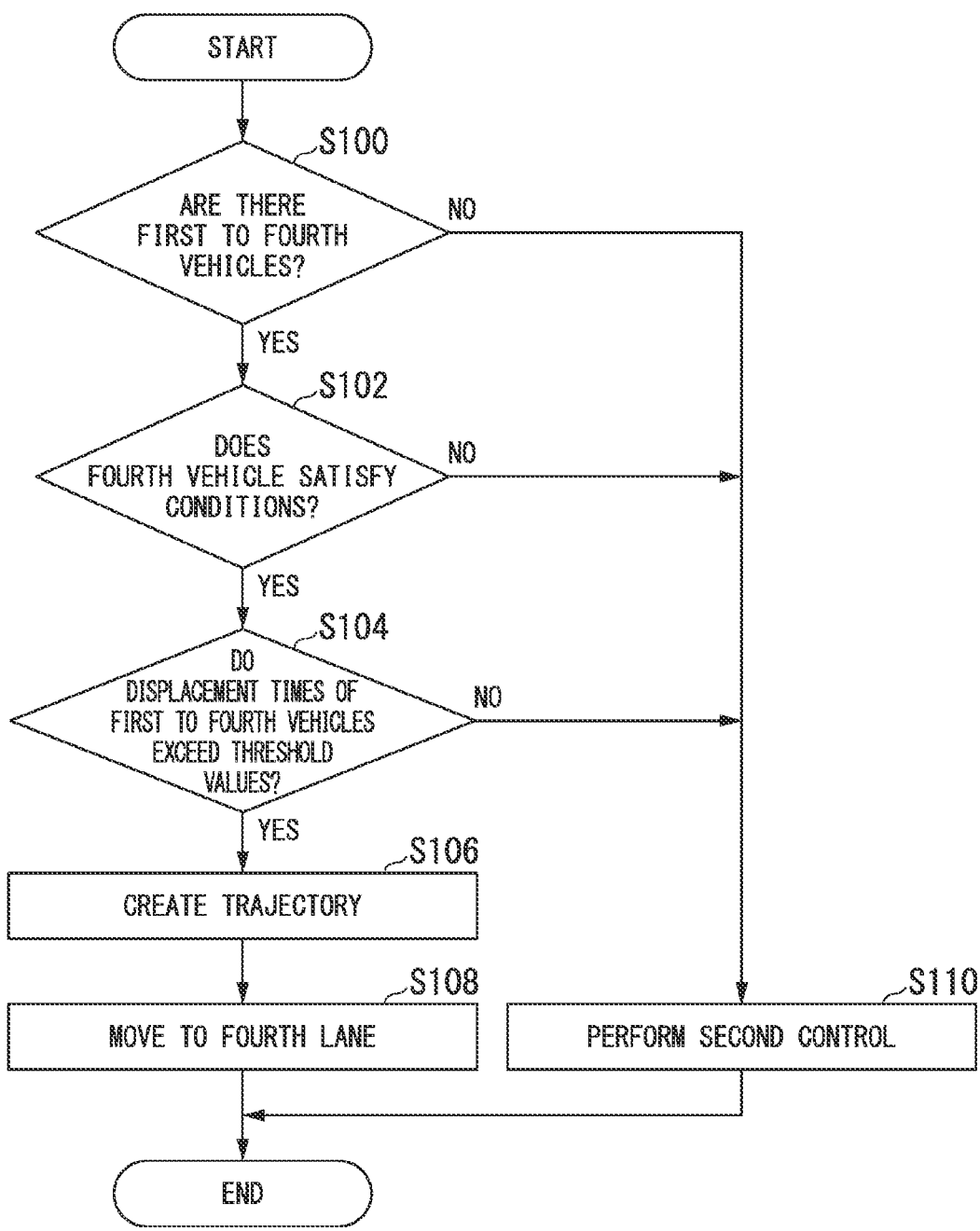
FIG. 9 is a flowchart showing an example of a flow of processes which are performed by an automated driving control device.

FIG. 9 is a flowchart showing an example of a flow of processes which are performed by the automated driving control device 100. First, the movement plan creator 140 determines whether there are the first to fourth other vehicles m1 to m4 on the basis of the first distance L1, the second distance L2, and the recognition result from the recognizer 130 (Step S100). When there are the first to fourth other vehicles m1 to m4, the movement plan creator 140 determines whether the fourth lane L4 satisfies a predetermined condition on the basis of the recognition result from the recognizer 130 (Step S102). The predetermined condition is a condition in which another vehicle is not present in a predetermined distance from the vehicle M in the travel direction.

When the fourth lane L4 satisfies the predetermined condition, the movement plan creator 140 determines whether the displacement times of the first to fourth other vehicles m1 to m4 are greater than the threshold values set for the first to fourth other vehicles m1 to m4 (Step S104). That is, it is determined whether the first to fourth conditions are satisfied.

When the displacement times of the first to fourth other vehicles m1 to m4 are greater than the threshold values set for the first to fourth other vehicles m1 to m4, the movement plan creator 140 generates a trajectory for allowing the vehicle M to pass between the first other vehicle m1 and the second other vehicle m2 and between the third other vehicle m3 and the fourth other vehicle m4 (Step S106). Then, the movement plan creator 140 causes the vehicle M to move to the fourth lane L4 on the basis of the generated trajectory (Step S108).

When it is determined in Step S100 that the first to fourth other vehicles m1 to m4 are not present, when it is determined in Step S102 that the fourth lane L4 does not satisfy the predetermined condition, or when it is determined in Step S104 that the displacement times of the first to fourth other vehicles m1 to m4 are not greater than the threshold values set for the first to fourth other vehicles m1 to m4, the movement plan creator 140 performs the second control (Step S110). For example, the movement plan creator 140 causes the vehicle M to move to the fourth lane L4 by passing behind the second other vehicle m2 and the fourth other vehicle m4 or to travel temporarily in the second lane L2 or the third lane L3. Accordingly, one routine of the flowchart ends.

In the aforementioned embodiment, the automated driving control device 100 causes the vehicle M to move to the fourth lane L4, but it may be determined whether the vehicle M is to move to the third lane L3 on the basis of the aforementioned idea when the vehicle M is going to move to the third lane L3. For example, when the first condition and the second condition are satisfied, the vehicle M moves to the third lane L3. For example, when the third other vehicle m3 and the fourth other vehicle m4 are not present and the displacement times of the first other vehicle m1 and the second other vehicle m2 are not greater than the threshold values set for the first other vehicle m1 and the second other vehicle m2, the vehicle M moves to the third lane L3 by passing between the first other vehicle m1 and the second other vehicle m2.

The automated driving control device 100 may determine whether the vehicle M is to move on the basis of the aforementioned idea when the vehicle M is going to move to a lane (for example, a fifth lane adjacent to the fourth lane L4) farther than the fourth lane L4. In this case, when a fifth other vehicle is present in front of the vehicle M in the fourth lane L4 in the travel direction of the vehicle M, a sixth other vehicle is present behind the vehicle M, the first to fourth conditions are satisfied, a relationship between the vehicle M and the fifth other vehicle satisfies a fifth condition, and a relationship between the vehicle M and the sixth other vehicle satisfies a sixth condition, the automated driving control device 100 causes the vehicle M to move to the fifth lane by the first control. The fifth condition is stricter than the third condition and the sixth condition is stricter than the fourth condition. The condition for the relationship between the vehicle M and another vehicle is as strict as a condition for the relationship between another vehicle present in a lane farther from the lane in which the vehicle M is traveling and the vehicle M. In this case, the condition for the relationship between another vehicle present in front of the vehicle M and the vehicle M is looser (less strict) than the condition for the relationship between another vehicle present behind the vehicle M and the vehicle M in the same lane as the other vehicle.

In the aforementioned embodiment, when it is determined that the relationship between the first other vehicle m1 and the vehicle M satisfies the first condition, the relationship between the second other vehicle m2 and the vehicle M satisfies the second condition stricter than the first condition, the relationship between the third other vehicle m3 and the vehicle M satisfies the third condition stricter than the first condition, and the relationship between the fourth other vehicle m4 and the vehicle M satisfies the fourth condition stricter than the third condition, the automated driving control device 100 causes the vehicle M to perform a lane change to the fourth lane L4 adjacent to the third lane L3 by causing the vehicle M to pass through an area between the first other vehicle m1 and the second other vehicle m2 in the travel direction and an area between the third other vehicle m3 and the fourth other vehicle m4 in the travel direction. Accordingly, it is possible to maintain a pace (speed) which is desired by the vehicle or an occupant of the vehicle during traveling of the vehicle.

Hardware Configuration

Figure 10:
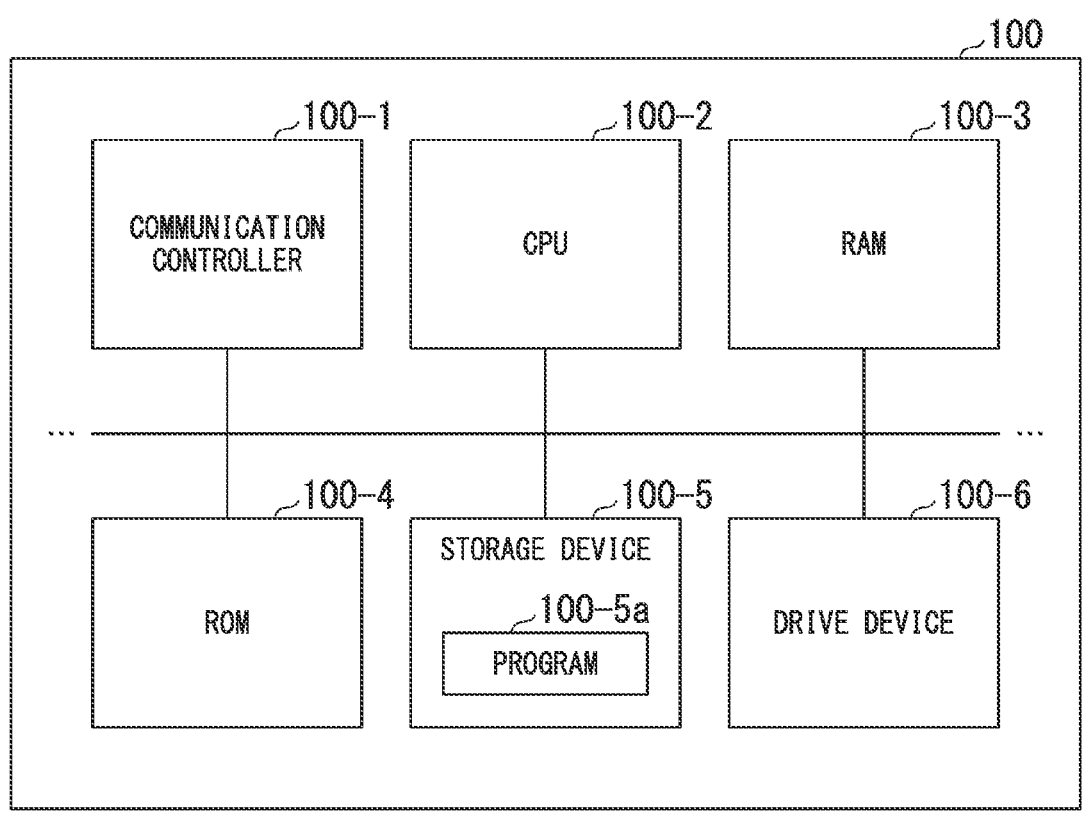
FIG. 10 is a diagram showing an example of a hardware configuration of the automated driving control device according to the embodiment.

FIG. 10 is a diagram showing an example of a hardware configuration of the automated driving control device 100 according to the embodiment. As shown in the drawing, the automated driving control device 100 has a configuration in which a communication controller 100-1, a CPU 100-2, a random-access memory (RAM) 100-3 which is used as a work memory, a read-only memory (ROM) 100-4 that stores a booting program or the like, a storage device 100-5 such as a flash memory or a hard disk drive (HDD), a drive device 100-6, and the like are connected to each other via an internal bus or a dedicated communication line. The communication controller 100-1 communicates with elements other than the automated driving control device 100. A program 100-5*a* which is executed by the CPU 100-2 is stored in the storage device 100-5. This program is loaded to the RAM 100-3 by a direct memory access (DMA) controller (not shown) or the like and is executed by the CPU 100-2. Accordingly, the first controller 120, the second controller 160, and some or all of the functional units included therein are realized.

The aforementioned embodiment can be expressed as follows:

A vehicle control device, including:
a storage device configured to store a program; and
a hardware processor,
wherein the hardware processor performs, by executing a program stored in the storage device:
recognizing surrounding conditions of a vehicle including at least a position and a speed of another vehicle which is traveling near the vehicle and travels in the same direction as the vehicle; and
causing the vehicle to travel based on the recognized surrounding conditions,
wherein the other vehicle includes:
a first other vehicle that is traveling in front of the vehicle in a traveling direction in a second lane adjacent to a first lane in which the vehicle is traveling and that is closest to the vehicle;
a second other vehicle that is traveling behind the vehicle in the traveling direction in the second lane and that is closest to the vehicle;
a third other vehicle that is traveling in front of the vehicle in the traveling direction in a third lane which is adjacent to the second lane and farther from the first lane than the second lane and that is closest to the vehicle; and
a fourth other vehicle that is traveling behind the vehicle in the traveling direction in the third lane and that is closest to the vehicle,
wherein the hardware processor is configured to acquire information of the other vehicles, and
wherein the hardware processor is configured to perform, when it is determined that a relationship between the first other vehicle and the vehicle satisfies a first condition, a relationship between the second other vehicle and the vehicle satisfies a second condition stricter than the first condition, a relationship between the third other vehicle and the vehicle satisfies a third condition stricter than the first condition, and a relationship between the fourth other vehicle and the vehicle satisfies a fourth condition stricter than the second condition and the third condition,
first control for causing the vehicle to perform a lane change to a fourth lane adjacent to the third lane by causing the vehicle to pass through an area between the first other vehicle and the second other vehicle in the traveling direction and an area between the third other vehicle and the fourth other vehicle in the traveling direction.

While the invention has been described with reference to embodiments, the invention is not limited to the embodiments and can be subjected to various modifications and substitutions without departing from the gist of the invention.

What is claimed is:

1. A vehicle control device, comprising:
   a storage device configured to store a program, wherein the storage device is representative of a hard disk drive; and
   one or more hardware processors, wherein the one or more hardware processors perform, by executing a program stored in the storage device:
   recognizing surrounding conditions of a vehicle including at least a position and a speed of another vehicle which is traveling within a proximity threshold distance to the vehicle and travels in the same direction as the vehicle, wherein the proximity threshold distance of the another vehicle and the vehicle is determined based on an absolute coordinate system with an origin set to a representative point of the vehicle; and
   causing the vehicle to travel based on the recognized surrounding conditions,
   wherein the other vehicle is representative of:
   a first other vehicle that is traveling in front of the vehicle in a traveling direction in a second lane adjacent to a first lane in which the vehicle is traveling and that is within the proximity threshold distance to the vehicle;

a second other vehicle that is traveling behind the vehicle in the traveling direction in the second lane and that is within the proximity threshold distance to the vehicle;

a third other vehicle that is traveling in front of the vehicle in the traveling direction in a third lane which is adjacent to the second lane and farther from the first lane than the second lane and that is within the proximity threshold distance to the vehicle; and a fourth other vehicle that is traveling behind the vehicle in the traveling direction in the third lane and that is within the proximity threshold distance to the vehicle, wherein the hardware processor is configured to acquire information of the other vehicle, and calculate displacement times based on a position of the other vehicle, a speed of the other vehicle, and a position of the vehicle or a position based on road structure, wherein the displacement times are a time period until the other vehicle reaches a reference position from a current position, wherein the hardware processor is configured to perform, in response to determining that a first displacement time calculated from a relationship between the first other vehicle and the vehicle is greater than a first threshold, a second displacement time calculated from a relationship between the second other vehicle and the vehicle is greater than a second threshold that is greater than the first threshold, a third displacement time calculated from a relationship between the third other vehicle and the vehicle is greater than a third threshold that is greater than the first threshold, and a fourth displacement time calculated from a relationship between the fourth other vehicle and the vehicle is greater than the second threshold and the third threshold, a first control for causing the vehicle to perform a lane change to a fourth lane adjacent to the third lane by causing the vehicle to pass through an area between the first other vehicle and the second other vehicle in the traveling direction and an area between the third other vehicle and the fourth other vehicle in the traveling direction.

2. The vehicle control device according to claim 1, wherein the first control is control for causing the vehicle to move to the fourth lane without staying in the second lane and the third lane for a predetermined time or more.

3. The vehicle control device according to claim 1, wherein the hardware processor is configured to perform a second control which is different from the first control when one of the first condition, the second condition, the third condition, and the fourth condition is not satisfied, and wherein the second control is control for causing the vehicle to stay in the second lane or the third lane for a predetermined time or more.

4. The vehicle control device according to claim 1, wherein the first other vehicle, the second other vehicle, the third other vehicle, and the fourth other vehicle are vehicles within a predetermined distance from the vehicle in the traveling direction.

5. The vehicle control device according to claim 1, wherein the hardware processor is configured to perform the first control when at least one of the first other vehicle, the second other vehicle, the third other vehicle, or the fourth other vehicle is not traveling within a predetermined distance from the vehicle in the traveling direction in the fourth lane.

6. A vehicle control device, comprising:

a storage device configured to store a program, wherein the storage device is representative of a hard disk drive; and one or more hardware processors, wherein the one or more hardware processors perform, by executing a program stored in the storage device:

recognizing surrounding conditions of a vehicle including at least a position and a speed of another vehicle which is traveling within a proximity threshold distance to the vehicle and travels in the same direction as the vehicle, wherein the proximity threshold distance of the another vehicle and the vehicle is determined based on an absolute coordinate system with an origin set to a representative point of the vehicle; and causing the vehicle to travel based on the recognized surrounding conditions, wherein the other vehicle is representative of:

a first other vehicle that is traveling in front of the vehicle in a traveling direction in a second lane adjacent to a first lane in which the vehicle is traveling and that is within the proximity threshold distance to the vehicle;

a second other vehicle that is traveling behind the vehicle in the traveling direction in the second lane and that is within the proximity threshold distance to the vehicle;

a third other vehicle that is traveling in front of the vehicle in the traveling direction in a third lane which is adjacent to the second lane and farther from the first lane than the second lane and that is within the proximity threshold distance to the vehicle; and a fourth other vehicle that is traveling behind the vehicle in the traveling direction in the third lane and that is within the proximity threshold distance to the vehicle, wherein the hardware processor is configured to acquire information of the other vehicle, and wherein the hardware processor is configured to perform, in response to determining that a first displacement time calculated from a relationship between the first other vehicle and the vehicle is greater than a first threshold, a second displacement time calculated from a relationship between the second other vehicle and the vehicle is greater than a second threshold that is greater than the first threshold, a third displacement time calculated from a relationship between the third other vehicle and the vehicle is greater than a third threshold is greater than the first threshold, and a fourth displacement time calculated from a relationship between the fourth other vehicle and the vehicle is greater than a fourth threshold that is greater than the second threshold and the third threshold, a first control for causing the vehicle to perform a lane change to a fourth lane adjacent to the third lane by causing the vehicle to pass through an area between the first other vehicle and the second other vehicle in a traveling direction and an area between the third other vehicle and the fourth other vehicle in the traveling direction, wherein the first displacement time is greater than the first threshold is that a time period when it is assumed that the first other vehicle is traveling at a specific position at which the vehicle is traveling in the traveling direction is greater than the first threshold, the time period is obtained by subtracting a time period until the first other vehicle reaches a reference position from a current location from a time period until the first other vehicle reaches the reference position,
wherein the second displacement time is greater than the second threshold is that a time period until the second other vehicle reaches the specific position from a current location is greater than the second threshold,
wherein the third displacement time is greater than the third threshold is that a time period when it is assumed that the third other vehicle is traveling at the specific position is greater than the third threshold, the time period is obtained by subtracting a time period until the third other vehicle reaches the reference position from a current location from a time period until the third other vehicle reaches the reference position, and
wherein the fourth displacement time is greater than the fourth threshold is that a time period until the fourth other vehicle reaches the specific position from a current location is greater than the fourth threshold.

7. The vehicle control device according to claim 6, wherein the second threshold value is greater than the first threshold value,
wherein the fourth threshold value is greater than the third threshold value,
wherein the third threshold value is greater than the first threshold value, and
wherein the fourth threshold value is greater than the second threshold value.

8. The vehicle control device according to claim 6, wherein the reference position is a start position at which the second lane is separated from the first lane in which the vehicle is traveling, and
wherein the hardware processor causes the vehicle to move to the fourth lane before the vehicle reaches the reference position.

9. A vehicle control method which is performed by a computer, the vehicle control method comprising:
recognizing surrounding conditions of a vehicle including at least a position and a speed of another vehicle which is traveling within a proximity threshold distance to the vehicle and travels in a same direction as the vehicle, wherein the proximity threshold distance from the another vehicle to the vehicle is determined based on an absolute coordinate system with an origin set to a representative point of the vehicle; and
causing the vehicle to travel based on the recognized surrounding conditions,
wherein the other vehicle is representative of:
a first other vehicle that is traveling in front of the vehicle in a traveling direction in a second lane adjacent to a first lane in which the vehicle is traveling and that is within the proximity distance threshold distance to the vehicle;
a second other vehicle that is traveling behind the vehicle in the traveling direction in the second lane and that is within the proximity distance threshold distance to the vehicle;
a third other vehicle that is traveling in front of the vehicle in the traveling direction in a third lane which is adjacent to the second lane and farther from the first lane than the second lane and that is within the proximity distance threshold distance to the vehicle; and
a fourth other vehicle that is traveling behind the vehicle in the traveling direction in the third lane and that is within the proximity distance threshold distance to the vehicle,
wherein the vehicle control method further comprises:
acquiring information of the other vehicle, and calculating displacement times based on a position of the other vehicle, a speed of the other vehicle, and a position of the vehicle or a position based on road structure, wherein the displacement times are a time period until the other vehicle reaches a reference position from a current location; and
performing a first control for causing the vehicle to perform a lane change to a fourth lane adjacent to the third lane by causing the vehicle to pass through an area between the first other vehicle and the second other vehicle in the traveling direction and an area between the third other vehicle and the fourth other vehicle in the traveling direction in response to determining that a first displacement time calculated from a relationship between the first other vehicle and the vehicle is greater than a first threshold, a second displacement time calculated from a relationship between the second other vehicle and the vehicle is greater that a second threshold that is greater than the first threshold, a third displacement time calculated from a relationship between the third other vehicle and the vehicle is greater than a third threshold that is greater than the first threshold, and a fourth displacement time calculated from a relationship between the fourth other vehicle and the vehicle is greater than a fourth threshold that is greater than the second threshold and the third threshold.

* * * * *